United States Patent
Noh et al.

(10) Patent No.: US 8,447,037 B2
(45) Date of Patent: May 21, 2013

(54) KEY TREE CONSTRUCTION AND KEY DISTRIBUTION METHOD FOR HIERARCHICAL ROLE-BASED ACCESS CONTROL

(75) Inventors: Jong-Hyouk Noh, Daejeon (KR); DeokJin Kim, Daejeon (KR); Soo Hyung Kim, Daejeon (KR); Seung-Hyun Kim, Daejeon (KR); Sang Rae Cho, Daejeon (KR); Young Seob Cho, Daejeon (KR); Jin-Man Cho, Daejeon (KR); Dae Seon Choi, Daejeon (KR); Seung Hun Jin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 408 days.

(21) Appl. No.: 12/786,811

(22) Filed: May 25, 2010

(65) Prior Publication Data

US 2011/0150224 A1    Jun. 23, 2011

(30) Foreign Application Priority Data

Dec. 21, 2009  (KR) ........................ 10-2009-0128315

(51) Int. Cl.
- *H04L 9/00* (2006.01)
- *H04L 9/08* (2006.01)
- *H04L 29/06* (2006.01)
- *G06F 11/30* (2006.01)
- *G06F 17/30* (2006.01)

(52) U.S. Cl.
USPC ............ 380/277; 380/278; 380/45; 713/165; 713/193

(58) Field of Classification Search
USPC ................. 713/150–174, 182–186, 189–193, 713/202; 709/229, 225; 726/2–8; 380/28–30, 380/44–47, 255–257, 277–286
See application file for complete search history.

(56) References Cited

U.S. PATENT DOCUMENTS

| | | | |
|---|---|---|---|
| 2003/0161474 A1* | 8/2003 | Matsuzaki et al. | 380/277 |
| 2006/0029226 A1 | 2/2006 | Han et al. | |
| 2006/0242427 A1* | 10/2006 | Ruzyski et al. | 713/186 |
| 2007/0110248 A1 | 5/2007 | Li | |
| 2008/0263370 A1* | 10/2008 | Hammoutene et al. | 713/193 |

FOREIGN PATENT DOCUMENTS

KR    100728260 B1    7/2007

OTHER PUBLICATIONS

Qiong Zhang et al., "A Centralized Key Management Scheme for Hierarchical Access Control," IEEE Communications Society Globecom 2004, pp. 2067-2071, 2004, IEEE.

* cited by examiner

*Primary Examiner* — Evans Desrosiers

(57) ABSTRACT

A key tree construction and key distribution method for hierarchical role-based access control, includes: constructing a key tree including relationships between a hierarchical structure of role groups and data; performing encryption and decryption of data keys and role keys; and generating a key table, in which the data keys required to decrypt encrypted data and the role keys required to decrypt encrypted data keys are stored, with reference to the key tree. Further, the key tree construction and key distribution method for hierarchical role-based access control includes performing management such that a specific role group can obtain a data key by performing decryption based on its own role key by using both the key tree and the key table.

9 Claims, 7 Drawing Sheets

FIG. 1

| USER MEMBERSHIP \ CONTENT | REAL-TIME SERVICE (111) | DOMESTIC BASEBALL (112) | MAJOR LEAGUE BASEBALL (113) | SOCCER (114) | K1 (115) | UFC (116) |
|---|---|---|---|---|---|---|
| PREMIUM (101) | ○ | ○ | ○ | ○ | ○ | ○ |
| DOMESTIC BASEBALL (102) | | ○ | | | | |
| BALL GAME (103) | | ○ | ○ | ○ | | |
| MIXED MARTIAL ARTS (104) | | | | | ○ | ○ |
| BASEBALL (105) | | ○ | | | | |
| SOCCER (106) | | | | ○ | | |
| UFC (107) | | | | | | ○ |

FIG.4

|    | R1 | R2 | R3 | R4 | R5 | R6 | R7 |
|----|----|----|----|----|----|----|----|
| R1 | $E_{K_{R1}}(K_{D1})$ | $E_{K_{R1}}(K_{R2})$ | $E_{K_{R1}}(K_{R3})$ | $E_{K_{R1}}(K_{R4})$ | | | |
| R2 | | $E_{K_{R2}}(K_{D2})$ | | | | | |
| R3 | | | | | $E_{K_{R3}}(K_{R5})$ | $E_{K_{R3}}(K_{R6})$ | |
| R4 | | | | $E_{K_{R4}}(K_{D5})$ | | | $E_{K_{R4}}(K_{R7})$ |
| R5 | | | | | $E_{K_{R5}}(K_{D2},K_{D3})$ | | |
| R6 | | | | | | $E_{K_{R6}}(K_{D4})$ | |
| R7 | | | | | | | $E_{K_{R7}}(K_{D6})$ |

# KEY TREE CONSTRUCTION AND KEY DISTRIBUTION METHOD FOR HIERARCHICAL ROLE-BASED ACCESS CONTROL

CROSS-REFERENCE TO RELATED APPLICATIONS

The present invention claims priority of Korean Patent Application No. 10-2009-0128315, filed on Dec. 21, 2009, which is incorporated herein by reference.

FIELD OF THE INVENTION

The present invention relates generally to technology for securely providing a data streaming service over the Internet; and, more particularly, to a key tree construction and key distribution method for hierarchical role-based access control, which is suitable for efficiently performing access control based on hierarchical roles.

BACKGROUND OF THE INVENTION

Generally, when a user accesses application data over the Internet or on a computer, it is possible for the user to access the data after verifying whether the user is the correct person capable of accessing the data and whether the user has authority to access the data. In this case, the verification of whether the user is a correct person capable of accessing the data is referred to as 'authentication,' and the verification of whether the user has authority to access the data is referred to as 'authorization.'

When the data which a user desires to access is important information, the data is stored after being encrypted, or is provided to the user after being encrypted when the data is provided to the user. In recent times, when a charged video service is provided over the Internet, the data is encrypted, and a key used to decrypt the data is provided to the service user, thus allowing only an authorized user to access the data.

Further, a data provider easily processes access control management by setting the concept of 'role' when managing users. This processing is referred to as 'role-based access control'. In the configuration of an actual organization, there are the concepts of hierarchy between roles and of an implicative relationship in which roles include other roles, and thus roles must be hierarchically configured to reflect such relationships.

In an environment in which a plurality of users receives data streams over the Internet as in the case of the above charged video service, a service provision server transmits data after encrypting the data, and separately provides keys required to decrypt the encrypted data to service users. Research into methods of efficiently providing keys to users, that is, efficient group key management methods, has been conducted for a long time. The core of this research is related to a method of efficiently providing updated keys to users in the cases where, when a user who newly requests subscription to a relevant service or when a user who withdraws from the service appears, keys required to encrypt and decrypt data must be updated.

The reason for updating keys when a user newly requests subscription to a service is that after a new subscriber illegally downloads previous data, he or she can decrypt the previously downloaded data using a key downloaded after subscribing to the service. Further, the reason for updating keys when a subscriber withdraws from the service is that, even after withdrawing from the service, the subscriber can illegally download data and can decrypt the data using a key kept in the subscriber.

Meanwhile, research into most group key management methods has been conducted in consideration of only the same access control for the provision of one type of data stream. However, a data provider provides various types of data streams as well as one type of data stream and is capable of assigning various memberships to individual users. For example, a data streaming service provider provides various types of data streams such as those related to news, sports, movies, entertainment, and economy, and may provide relevant services in such a way as to classify user memberships into premium, gold, silver and regular service levels. Such a service provider provides data streams after encrypting the data streams using their unique keys, and provides keys required to decrypt the data streams to users depending on membership levels assigned to the users. Research into the efficient solution of this process is called 'hierarchical access control'.

In a conventional access control scheme operated as described above, when a user who newly requests subscription to a service and or withdraws from the service appears, keys required to encrypt and decrypt data must be updated and provided to users. However, since the updated keys must be provided to even users who do not use the service, the unnecessary distribution of keys occurs, and thus the unnecessary consumption of network resources occurs.

SUMMARY OF THE INVENTION

In view of the above, the present invention provides a key tree construction and key distribution method for hierarchical role-based access control, which can efficiently perform access control based on hierarchical roles in an environment in which a data streaming service is provided over the Internet or the like.

Further, the present invention provides a key tree construction and key distribution method for hierarchical role-based access control, which constructs a key tree for efficiently performing access control based on hierarchical roles and provides a key table that can be accessed by any user in an environment in which a data streaming service is provided over the Internet or the like, thus conveniently and securely distributing keys to users and reducing the consumption of network resources that occurs due to the unnecessary distribution of keys.

In accordance with an embodiment of the present invention, there is provided a key tree construction and key distribution method for hierarchical role-based access control, including: constructing a key tree including relationships between a hierarchical structure of role groups and data; performing encryption and decryption of data keys and role keys; generating a key table, in which the data keys required to decrypt encrypted data and the role keys required to decrypt encrypted data keys are stored, with reference to the key tree; and performing management such that a specific role group can obtain a data key by performing decryption based on its own role key by using both the key tree and the key table. Preferably, the generating the key table comprises generating the key table, in which data keys required to decrypt respective pieces of data and role keys required to decrypt the respective data keys are stored in corresponding cells, and updating the key table depending on change in the role groups.

Preferably, the key table includes role cells indicating that role groups in an i-th row have roles higher than those of role groups in a j-th column when cells in the i-th row and the j-th column of the key table are not empty spaces.

Preferably, the role cells encrypt and store role keys corresponding to the role groups in the i-th column so that the role keys corresponding to the role groups in the j-th column can be decrypted using role keys corresponding to the role groups in the i-th row.

Preferably, the key table includes data cells in which data keys encrypted using role keys of relevant role groups are stored in an i-th row and an i-th column of the key table.

Preferably, the updating the key table comprises, when a user of a specific role group is changed, changing roll cells in a relevant column corresponding to the user, and changing data cells, which can be accessed by the specific role group.

Preferably, the key tree and the key table are pieces of information that can be accessed by all users belonging to role groups which subscribed to a relevant service.

Further, when the user desires to use a service, whether the user can access desired service data is determined by generating a link from a role of the user to the desired service data using both the key tree and the key table, a required role key and data key are obtained from the key table using the link, and then the desired service data is decrypted using the data key.

As described above, the key tree construction and key distribution method for hierarchical role-based access control according to embodiments of the present invention is configured to construct a key tree required to efficiently perform access control based on hierarchical roles and to provide a key table that can be accessed by anyone in an environment in which a data streaming service is provided over the Internet, thus conveniently and securely distributing keys to users.

Accordingly, the key tree construction and key distribution method for hierarchical role-based access control according to embodiments of the present invention has the following one or more advantages.

The key tree construction and key distribution method for hierarchical role-based access control according to the embodiments of the present invention is advantageous in that a key tree construction method capable of indicating relations between a hierarchical role structure and data is provided, and a key table management method, which is a key distribution method of reducing the burden of users and network resources, is provided, thus securely and efficiently providing data streams to users in an Internet environment.

BRIEF DESCRIPTION OF THE DRAWINGS

The objects and features of the present invention will become apparent from the following description of preferred embodiments given in conjunction with the accompanying drawings, in which:

FIG. 1 is a diagram showing a hierarchical access relationship between user groups and resources in accordance with an embodiment of the present invention;

FIG. 4 is a diagram showing the structure of a key table for efficient key distribution in accordance with the embodiment of the present invention;

DETAILED DESCRIPTION OF THE EMBODIMENTS

Figure 2:
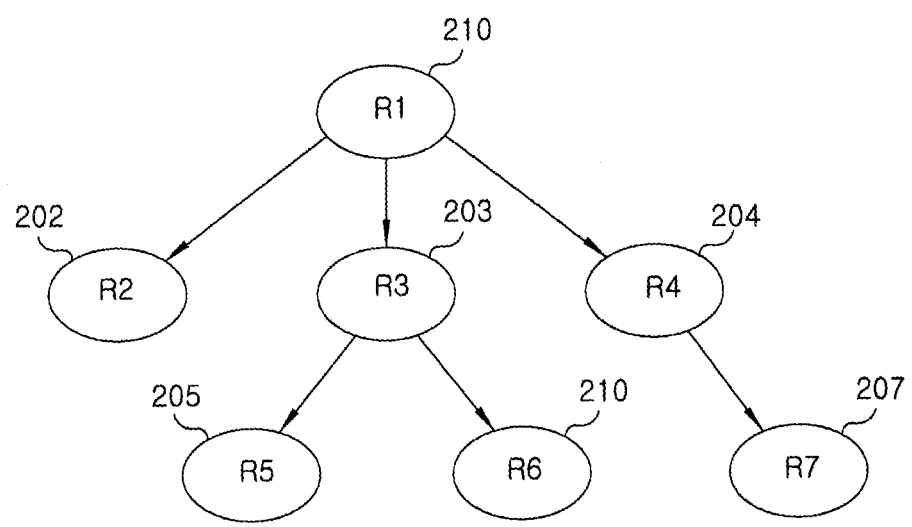
FIG. 2 is a diagram showing a hierarchical role tree indicating a hierarchical structure of roles in accordance with the embodiment of the present invention.

Hereinafter, embodiments of the present invention will be described in detail with reference to the accompanying drawings which form a part hereof.

FIG. 1 is a diagram showing a hierarchical access relationship between user groups and resources in accordance with the embodiment of the present invention.

Referring to FIG. 1, a hierarchical access relationship obtained when seven user groups 101, 102, 103, 104, 105, 106 and 107 and six resources 111, 112, 113, 114, 115 and 116 are used is shown.

A user belonging to a premium membership 101 can access all items of content, a user belonging to a ball game membership 103 can access content related to a domestic baseball 112, the Major League baseball 113, and soccer 114, and a user belonging to an Ultimate Fighting Championship (UFC) membership 107 can access content related to UFC 116. Meanwhile, referring to FIG. 1, content related to real-time service 111 can be accessed only by users belonging to the premium membership 101, and content related to the domestic baseball 112 can be accessed by users belonging to the premium membership 101, a domestic baseball membership 102, the ball game membership 103, and a baseball membership 105. In this way, various types of content and memberships may form very complicated relationships.

FIG. 2 is a diagram showing a hierarchical role tree indicating a hierarchical structure of roles in accordance with the embodiment of the present invention.

Referring to FIG. 2, each arrow connecting roles to each other denotes a hierarchical relationship in roles. For example, 'Ri→Rj' denotes that users belonging to Ri can access all data that can be accessed by users belonging to Rj. That is, users belonging to R3 203 can access all data that can be accessed by users belonging to R5 205 and R6 206.

R1 of FIG. 2 refers to a premium membership, R2 202 refers to a domestic baseball membership, R3 203 refers to a ball game membership, R4 204 refers to a mixed martial arts membership, R5 205 refers to a baseball membership, R6 206 refers to a soccer membership, and R7 207 refers to a UFC membership. According to the hierarchical structure, for example, the baseball membership and the soccer membership are lower layers of the ball game membership.

This structure means that users belonging to the ball game membership can access both content that can be accessed by users having the baseball membership and content that can be accessed by users having the soccer membership.

Figure 3:
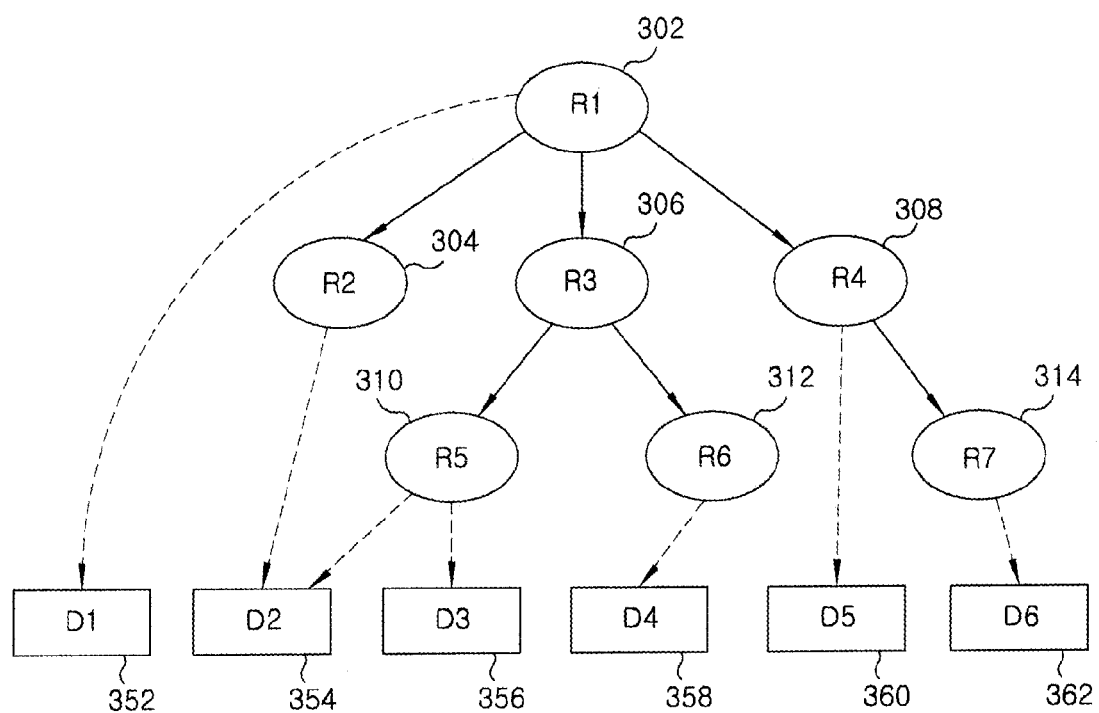
FIG. 3 is a diagram showing a key tree structure in which authorities to access data are included in a hierarchical role tree in accordance with the embodiment of the present invention.

FIG. 3 is a diagram showing a tree structure in which authorities to access data are included in a hierarchical role tree in accordance with the embodiment of the present invention.

Referring to FIG. 3, roles or role groups and data are connected to each other via dotted arrows in a hierarchical role data relation tree (hereinafter referred to as a 'key tree'). For example, 'Ri→Dj' denotes that a user belonging to Ri can access data Dj. The leaf nodes 304, 310, 312 and 314 of the key tree are connected to data nodes 352 to 362. Since roles R1 302 and R4 308, other than the leaf nodes, have their own unique authorities to access data, they are respectively connected to data nodes 352 and 360 which can be accessed by the unique data access authorities thereof. Such a key tree can be represented by a graph, a code or data information, which indicates a hierarchical relationship between roles.

Meanwhile, a data node D2 354 is connected to the role nodes R2 304 and R5 310. The reason for this connection is that various relationships between roles and data are actually formed. In a plurality of pieces of existing research, there are many cases where relationships were limitedly formed between roles and data or where roles were not hierarchically represented, and thus the above-described various relationships were not represented.

The structure of FIG. 3 will be described below in accordance with the embodiment of the present invention. D1 352 of FIG. 3 denotes real-time service content, D2 354 denotes domestic baseball content, D3 356 denotes the Major League content, D4 358 denotes soccer content, D5 360 denotes K1 content, and D6 362 denotes UFC content. Referring to the dotted arrows of FIG. 3, a user belonging to R2 304, that is, the domestic baseball membership, can access content D2 354, that is, domestic baseball content, and a user belonging to R3 306, that is, the ball game membership, can access content D2 354 (domestic baseball content), content D3 356 (the Major League baseball content), and content D4 358 (soccer content).

Meanwhile, each of the role nodes and the data nodes has its own unique key. A role node Ri has a unique key $K_{Ri}$, and a data node Di has a unique key $K_{Di}$. The key $K_{Ri}$ of the role node a key possessed by users belonging to a relevant role. Further, when a data stream corresponding to the data node Di is transmitted over a network, it is encrypted using the key $K_{Di}$ of the data node and then transmitted. Therefore, users having authorities to access Di can decrypt the data stream only when obtaining the key $K_{Di}$. For example, users who belong to R1 302, R2 304, R3 306, and R5 310 and have authorities to access D2 354 in FIG. 3 can decrypt encrypted content D2 354 only when obtaining a key $K_{D2}$.

Methods in which users corresponding to relevant roles obtain keys can be implemented by using a key table shown in FIG. 4.

A content service provider allows all users having membership to access the key table, and users who require the decryption of content can access the key table and obtain keys required to decrypt desired data from the key table.

FIG. 4 is a diagram showing the structure of a key table for efficient key distribution in accordance with the embodiment of the present invention. Referring to FIG. 4, a key table represents a hierarchical relationship for roles and a set of accessible keys. In the case where a cell (i, j) in the key table is not an empty space (i≠j), this case means that Ri is a role higher than That is, in order for Ri to access data that can be accessed by Rj, a user belonging to Ri can obtain the role key $K_{Rj}$ of Rj using a role key $K_{Ri}$. For this operation, the role key $K_{Rj}$ of Rj is encrypted using the role key $K_{Ri}$ of Ri and is then stored in the cell (i, j).

Further, in a cell (i, i), a data key $K_{Dk}$ required to decrypt data Dk that can be accessed by the user of Ri is encrypted using the role key $K_{Ri}$ of Ri. Cells in which the number of a row and the number of a column are different from each other, as in the case of the (i, j) are called 'role cells' and cells in which the number of the row and the number of the column are identical to each other, as in the case of the cell (i, i), are called 'data cells'.

A description will be made with reference to the key tree of FIG. 3 and the key table of FIG. 4. In detail, since R1 302 is a role higher than R2 304, R3 306, and R4 308, $E_{KR1}(K_{R2})$, $E_{KR1}(K_{R3})$, and $E_{KR1}(K_{R4})$, which are obtained by encrypting, using the role key $K_{R1}$ of R1, the role keys $K_{R2}$, $K_{R3}$ and $K_{R4}$ possessed by R2 304, R3 306, and R4 308, are respectively stored in role cells (1, 2), (1, 3) and (1, 4). In a data cell (1, 1), a value $E_{KR1}(K_{D1})$, which is obtained by encrypting, using the role key $K_{R1}$ of R1, the key $K_{D1}$ required to decrypt data Di 352 that can be accessed by R1 302, is stored.

In this way, since R1 302 is a role at the highest position, the user belonging to R1 302 can access all data. For example, in order for the user belonging to R1 302 to access data D5 360, the role key of R4 308 is required. The roles which can access respective pieces of data can be known with reference to the key tree. Therefore, the role key $K_{R4}$ of R4 308 can be obtained by decrypting $E_{KR1}(K_{R4})$ stored in the role cell (1, 4). The key $K_{D5}$ used to encrypt data D5 360 can be obtained by decrypting $E_{KR4}(K_{D5})$ stored in a data cell (4, 4). The key tree and the key table are generated by the service provider, and allow all users who subscribed to the service to access them.

The key table is updated when service users are changed (new subscription to or withdrawal from the service). For example, when the member of the role R2 304 is changed, both the role key $K_{R2}$ of the R2 304 and the data key $K_{D2}$ of the data D2 354 that can be accessed by the authority of R2 304 must be changed. First, the role key $K_{R2}$ of R2 304 is changed to $K_{R2}'$ using a predetermined method, for example, a group key management method into which a plurality of pieces of research has already been conducted. When the role key of R2 304 is changed to $K_{R2}'$, the service provider changes all role cells corresponding to R2 304 column of the key table. Referring to FIG. 4, $E_{KR1}(K_{R2})$ is changed to $E_{KR1}(K_{R2}')$ in the roll cell (1, 2).

Further, after changing $K_{D2}$ to $K_{D2}'$, the service provider updates data cells for R2 304 and R5 310 having authority to access data D2 354. That is, a value stored in a data cell (2, 2) is updated to $E_{KR2}(K_{D2}')$, and the value stored in the data cell (5, 5) is updated to $E_{KR2}(K_{D2}',K_{D3})$.

In the conventional group key management method, a key required to decrypt content is distributed to users by generating key update messages. When the number of users is large, the number of messages required to distribute the key increases, and thus various methods for reducing the number of messages have been proposed. However, these methods are problematic in that key update messages are provided to even users who do not require the key at the time of distributing the key. When the key table of the present invention is used, users can directly obtain the key when needing to decrypt data, thus greatly decreasing communication costs.

Figure 5:
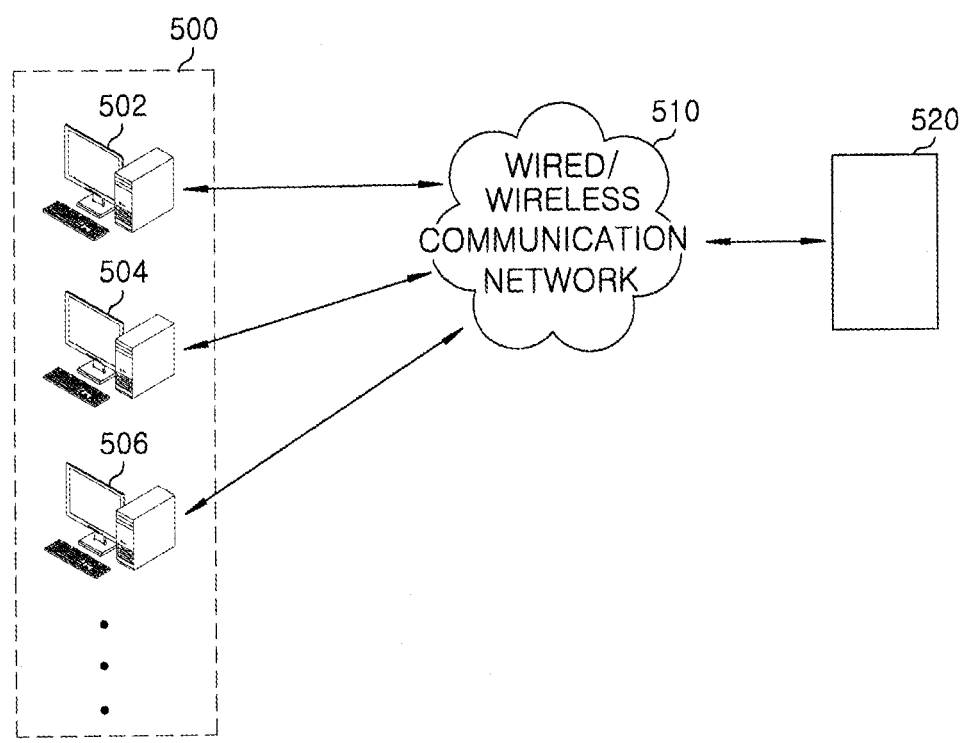
FIG. 5 is a diagram showing the construction of a data service system in a wired/wireless communication network in accordance with the embodiment of the present invention.

FIG. 5 is a diagram showing the construction of a data service system in a wired/wireless communication network in accordance with the embodiment of the present invention.

Referring to FIG. 5, the data service system includes a user group 500 composed of a plurality of users, and a service provision server 520 configured to provide data which is requested by the user group 500 in conjunction with a wired/wireless communication network 510.

The user group 500 includes one or more user computing devices 502, 504 and 506, which are connected to the wired/wireless communication network 510 and may be connected to one other. Further, the user computing devices 502, 504 and 506 may request data or data streams from the service provision server 520 and then may receive the data, or may be provided with a data streaming service from the service provision server 520.

In this case, the user computing devices 502, 504 and 506 are assigned authorities to access the data or data streams provided by the service provision server 520. For example, access authorities can be divided into various access authority levels, as shown in FIG. 1. Depending on the access authority levels, authorities to request or receive data and to receive and then decrypt data may differ.

In this way, the access authority levels may be set before a relevant service is used. When an approval is obtained by the service provision server 520 even during the use of the service, the current access authority level may vary. That is, the service provision server 520 determines whether to use data, or transmits encrypted data on the basis of authority levels in response to data requests received from the user computing devices 502, 504 and 506. Accordingly, the user computing devices 502, 504 and 506, having received the encrypted data, obtain data keys required to decrypt the encrypted data by using role keys assigned thereto depending on the access authority levels, and thereafter decrypt and use the data. The wired/wireless communication network 510 may be implemented as, for example, the Internet, and enables the user group 500 to be connected to the service provision server 520 in a wired or wireless manner, with the result that data communication can be performed.

The service provision server 520 provides or performs data or a data streaming service, which is requested by the user group 500, while operating in conjunction with the wired/wireless communication network 510. When transmitting each piece of data to a relevant computing device corresponding to the access authority level thereof, the service provision server 520 encrypts the data using a relevant data key, and then transmits the encrypted data.

Information about the access authority levels is composed of a key tree structure, which indicates relationships between data and roles, and a key table, which enables each user to conveniently obtain a data key required to access data according to a relevant group to which the user belongs. The access authority level information can be accessed by all computing devices which subscribed to the service provided by the service provision server 520.

Figure 6:
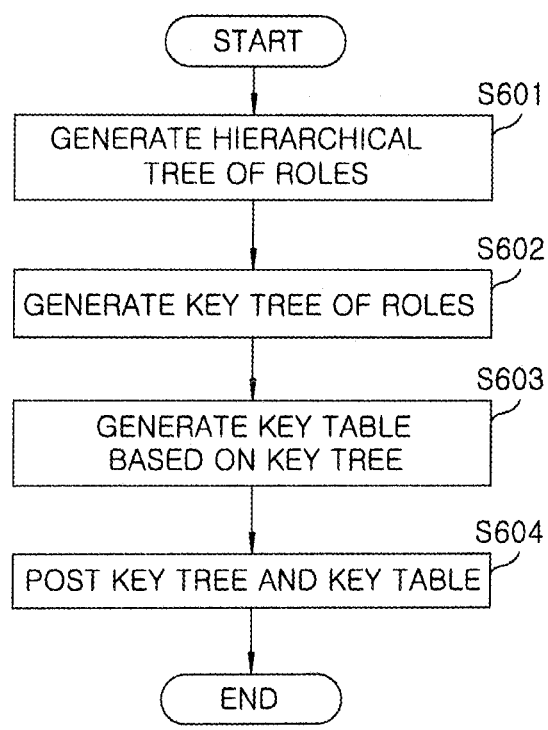
FIG. 6 is a flow chart showing the operating procedure of a service provision server in accordance with the embodiment of the present invention.

FIG. 6 is a flow chart showing the operating procedure of the service provision server in accordance with the embodiment of the present invention.

Referring to FIG. 6, the service provision server 520 constructs a hierarchical tree of roles (hierarchical role tree) in step S601, and constructs a key tree by connecting the hierarchical tree of roles to service data nodes in step S602. The key tree indicates whether users belonging to each role can access data. Further, the service provision server 520 generates a key table enabling data keys, required to decrypt the service data, to be obtained using the role keys of the users, with reference to the key tree in step S603. The key tree and the key table are posted so that each service user can access them in step S604.

Thereafter, when the membership of each user is updated, the role key of a role group, for which the membership of the user is changed, is changed by using a conventional group key management method, and the changed role key is applied to the key table, and thereafter the changed key table is posted.

Figure 7:
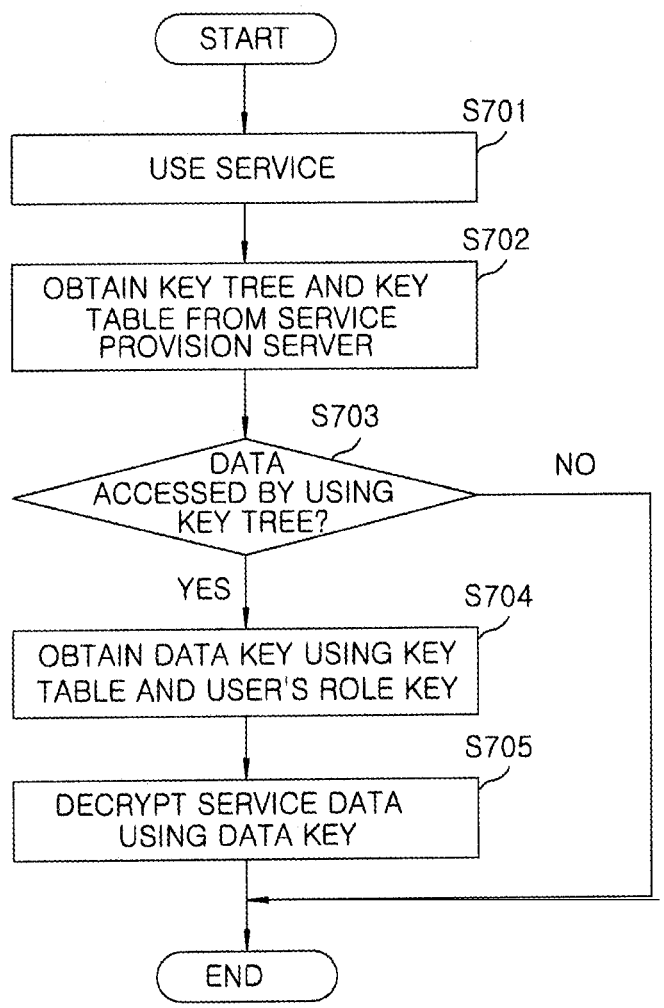
FIG. 7 is a flow chart showing the operating procedure of a user computing device in accordance with the embodiment of the present invention.

FIG. 7 is a flow chart showing the operating procedure of a user computing device in accordance with the embodiment of the present invention.

Referring to FIG. 7, when a user desires to use a service provided by the service provision server 520 using a computing device, that is, a client, in step S701, the computing device, which has received a command from the user, obtains a key tree and a key table posted by the service provision server 520 in step S702. In step S703, whether the user can access his or her desired service by his or her role is determined by using the key tree. That is, a link must be connected from the role Ri of the user to the desired data Dx by using the key tree. For example, in FIG. 3, when the role of the user is R3 306, and the user's desired data is D3 356, a link satisfying R3 306⇒ R5 310⇒ D3 356 is present, so that it can be determined that the user can access the data of the desired service.

If it is determined in step S703 that the user can access the service, the process proceeds to step S704 where a data key required to decrypt the desired service data is obtained from the key table. That is, on the basis of the link generated in step S703, a role key and a data key are obtained. For example, when the link satisfies R3 306⇒ R5 310⇒ D3 356, $E_{K_{R3}}(K_{R5})$ of a cell (R3, R5) is searched for in the key table and is decrypted using the role key $K_{R3}$ of the user, and thus $K_{R5}$ is obtained. Next, $E_{K_{R5}}(K_{D2}, K_{D3})$ of a cell (R5, R5) is searched for in the key table and is decrypted using the role key $K_{R5}$ obtained in the previous procedure, and thus a data key $K_{D2}$ can be obtained. Further, in step S705, the desired service data is decrypted using the obtained data key $K_{D2}$.

While the invention has been shown and described with respect to the preferred embodiments, it will be understood by those skilled in the art that various changes and modifications may be made without departing from the scope of the invention as defined in the following claims.

What is claimed is:

1. A key tree construction and key distribution method for hierarchical role-based access control, comprising:
   constructing a key tree including relationships between a hierarchical structure of role groups and data;
   performing encryption and decryption of data keys and role keys;
   generating a key table, in which the data keys required to decrypt encrypted data and the role keys required to decrypt encrypted data keys are stored, with reference to the key tree; and
   performing management such that a specific role group can obtain a data key by performing decryption based on its own role key by using both the key tree and the key table,
   wherein the step of generating the key table includes storing data keys required to decrypt respective pieces of data and role keys required to decrypt respective data keys in corresponding cells, and updating the key table depending on change in the role groups.

2. The key tree construction and key distribution method of claim 1, wherein the key table includes role cells indicating that role groups in an i-th row have roles higher than those of role groups in a j-th column when cells in the i-th row and the j-th column of the key table are not empty spaces.

3. The key tree construction and key distribution method of claim 2, wherein the role cells encrypt and store role keys corresponding to the role groups in the j-th column so that the role keys corresponding to the role groups in the j-th column can be decrypted using role keys corresponding to the role groups in the i-th row.

4. The key tree construction and key distribution method of claim 1, wherein the key table includes data cells in which data keys encrypted using role keys of relevant role groups are stored in an i-th row and an i-th column of the key table.

5. The key tree construction and key distribution method of claim 1, wherein the updating the key table comprises:
   when a user of a specific role group is changed, changing roll cells in a relevant column corresponding to the user; and changing data cells, which can be accessed by the specific role group.

6. The key tree construction and key distribution method of claim 1, wherein the constructing the key tree comprises:
representing items related to service membership of users by role nodes;
representing the role nodes in a form of a tree by schematizing the role nodes using a hierarchical access relationship;
representing content, which can be accessed by the users, by data nodes; and
representing an access control structure between the users and data by connecting the role nodes of the hierarchical structure of the roles, represented in the form of the tree, to the data nodes,
wherein the role nodes and the data nodes have role keys and data keys, respectively.

7. The key tree construction and key distribution method of claim 1, wherein the key tree and the key table are pieces of information that can be accessed by all users belonging to role groups which subscribed to a relevant service.

8. The key tree construction and key distribution method of claim 1, wherein the performing the management comprises:
a computing device, which receives a command from a user, determining based on the key tree whether desired data can be accessed by a specific role of the user;
if it is determined that the desired data can be accessed, obtaining a role key required in the hierarchical structure of roles by using the user's own role key in order to obtain a data key of the desired data from the key table;
obtaining a role key required in the hierarchical role structure using the obtained role key; and
obtaining a data key required to decrypt the desired data by using the user's own role key or the obtained role key.

9. The key tree construction and key distribution method of claim 1, wherein the updating the key table comprises:
changing the role keys of the role groups which have the change and the data keys being decrypted by the role keys of the role groups which have the change.

* * * * *